United States Patent
Alwattari et al.

(10) Patent No.: US 12,209,189 B2
(45) Date of Patent: Jan. 28, 2025

(54) VEHICLE CERAMIC SURFACE TREATMENT COMPOSITION AND PROCESS FOR USE THEREOF

(71) Applicant: Illinois Tool Works Inc., Glenview, IL (US)

(72) Inventors: Ali Alwattari, Glenview, IL (US); Tsao-Chin Clarence Huang, Glenview, IL (US); John Isidoro Escoto, Jr., Glenview, IL (US)

(73) Assignee: Illinois Tool Works Inc., Glenview, IL (US)

(*) Notice: Subject to any disclaimer, the term of this patent is extended or adjusted under 35 U.S.C. 154(b) by 333 days.

(21) Appl. No.: 17/386,010

(22) Filed: Jul. 27, 2021

(65) Prior Publication Data
US 2022/0041867 A1 Feb. 10, 2022

Related U.S. Application Data

(60) Provisional application No. 63/062,603, filed on Aug. 7, 2020.

(51) Int. Cl.
| | |
|---|---|
| *C09D 1/04* | (2006.01) |
| *C09D 7/40* | (2018.01) |
| *C09D 7/47* | (2018.01) |
| *C09D 7/65* | (2018.01) |
| *B82Y 30/00* | (2011.01) |
| *B82Y 40/00* | (2011.01) |

(52) U.S. Cl.
CPC ............... *C09D 1/04* (2013.01); *C09D 7/47* (2018.01); *C09D 7/65* (2018.01); *C09D 7/67* (2018.01); *C09D 7/68* (2018.01); *B82Y 30/00* (2013.01); *B82Y 40/00* (2013.01)

(58) Field of Classification Search
CPC ... C09D 1/04; C09D 7/65; C09D 7/67; C09D 7/68; C09D 7/47; B82Y 30/00; B82Y 40/00
See application file for complete search history.

(56) References Cited

U.S. PATENT DOCUMENTS

| | | |
|---|---|---|
| 2,597,871 A | 5/1952 | Her |
| 3,130,061 A | 4/1964 | McMahon et al. |
| 3,342,748 A * | 9/1967 | Marotta ............... C01B 33/148 516/82 |
| 4,535,109 A | 8/1985 | Kondo et al. |
| 4,997,478 A | 3/1991 | Gordon |
| 7,074,262 B2 * | 7/2006 | Huang .................. C08J 3/02 106/3 |
| 8,241,416 B2 | 8/2012 | Kishimoto |
| 2009/0011256 A1 | 1/2009 | Ito et al. |
| 2009/0050018 A1 | 2/2009 | Kishimoto |
| 2017/0015843 A1 | 1/2017 | Liu et al. |
| 2019/0315972 A1 | 10/2019 | Kiyomori et al. |

FOREIGN PATENT DOCUMENTS

| | | | |
|---|---|---|---|
| CN | 106085247 B | 6/2018 | |
| GB | 702228 A | 1/1954 | |
| WO | WO-2017007920 A1 * | 1/2017 | ............. C08G 77/16 |
| WO | WO-2018230328 A1 * | 12/2018 | ............... B05D 3/12 |

OTHER PUBLICATIONS

Machine Translation of WO 2018230328 A1. (Year: 2018).*
Malshe et al. "Fluorinated acrylic copolymers Part II: Polymeric surfactants". Progress in Organic Coatings 53 (2005) p. 212-216. (Year: 2005).*
Pertoft et al. "Density Gradients Prepared from Colloidal Silica Particles Coated by Polyvinylpyrrolidone (Percoll)". Analytical Biochemistry 88 (1978), p. 271-282. (Year: 1978).*
Dalbin et al. "Silica-based coating for corrosion protection of electrogalvanized steel". Surface & Coatings Technology 194 (2005), p. 363-371. (Year: 2005).*
International Search Report issued in PCT/US2021/043425, dated Nov. 17, 2021.

* cited by examiner

*Primary Examiner* — Melissa S Swain
*Assistant Examiner* — Catriona M Corallo
(74) *Attorney, Agent, or Firm* — MaxGoLaw PLLC

(57) ABSTRACT

A vehicle surface treatment composition includes a colloidal inorganic oxide dispersion or a soluble silicate amenable to application to both porous and semi-porous vehicle hard surfaces to provide a multi-surface protective barrier that imparts water repellency and weathering protection properties to the vehicle finish. The composition provides a hard surface cleaning and forms a coating to the applied surface. The compositions provide treated surface properties that include keeping clean, scratch/mar defense, bug repellency, UV protection, and weathering defense. The compositions create treated surfaces that are highly smooth and lubricious which provide enhanced protection, while achieving a high luster finish with a streak free appearance. The composition is readily applied through resort to a conventional trigger spray application, propellant aerosol, or a sponge or cloth for wipe application onto the vehicle surface.

14 Claims, No Drawings

VEHICLE CERAMIC SURFACE TREATMENT COMPOSITION AND PROCESS FOR USE THEREOF

RELATED APPLICATIONS

This application claims priority benefit of U.S. Provisional Application Ser. No. 63/062,603 filed Aug. 7, 2020; the contents of which are hereby incorporated by reference.

FIELD OF THE INVENTION

The present invention in general relates to surface treatment compositions and the use thereof and in particular, to such a composition that includes at least one colloidal oxide dispersion amenable to application to both porous and semi-porous vehicle hard surfaces to provide a protective barrier that imparts water repellency and weathering protection properties to the vehicle finish.

BACKGROUND OF THE INVENTION

As the wear and environmental exposure increases on a vehicle, the exposed surfaces often become dull and unattractive. This is due to various causes including wind, weather, sunlight, scratching, abrasion from dirt, and other chemical and physical reactions. The degradation of the surfaces can initiate compromise not only of coatings such as paint, but also corrosion of underlying substrates.

Many products are available today on the market for vehicles to address these adverse effects. Many of these treatment products restore an older appearance from a dull, weathered appearance to a shiny, bright, and like-new condition. Conventional products have limited longevity on the vehicle surface due to the fact that these conventional products are essentially polymeric coatings that provide a high sheen to the surface, yet are themselves quite soft and prone to abrasion degradation.

The inclusion of colloidal particulate in cured compositions such a polyacrylics is routinely done to modify the properties of cured polymers. Y-Y Yu et al. Materials Chemistry and Physics 82 (2003) 388-395. However, such dispersions are not found in automotive waxes and polishes, largely due to concerns about the prospect of abrading the substrate during buffing. Additionally, hydrophobic vehicles polishes disfavor the inclusion of aqueous dispersions of particulate.

Thus, there exists a need for a vehicle hard surface treatment composition that provides enhanced surface properties that include at least one of dirt repellency, scratch/mar defense, bug repellency, UV protection, and weathering defense. There further exists a need for the vehicle hard surface treatment composition to afford this enhancement without sacrificing the sheen imparts to vehicles surfaces by conventional products.

SUMMARY OF THE INVENTION

A vehicle surface treatment composition is provided that includes a colloidal inorganic oxide dispersion amenable to application to both porous and semi-porous vehicle hard surfaces to provide a multi-surface protective barrier that imparts water repellency and weathering protection properties to the vehicle finish. The composition provides a hard surface cleaning and also forms a residual film to the applied surface. The compositions provide treated surface properties that include keeping clean, scratch/mar defense, bug repellency, UV protection, and weathering defense. The compositions create treated surfaces that are highly smooth and lubricious which provide enhanced protection against scratches, chips, stains, tree gum, bird droppings, water spot protection, ease of cleaning, and protection against the contaminants and stains, while achieving a high luster finish with a streak free appearance. The composition is readily applied through resort to a conventional trigger spray application, propellant aerosol, or a sponge or cloth for wipe application onto the vehicle surface.

DETAILED DESCRIPTION OF THE PREFERRED EMBODIMENTS

The present invention has utility as a vehicle surface treatment composition that includes at least one colloidal oxide dispersion amenable to application to both porous and semi-porous vehicle hard surfaces to provide a multi-surface protective barrier that imparts water repellency and weathering protection properties to the vehicle finish. The improved vehicle hard surface treatment compositions create treated surfaces that are highly smooth and lubricious which provide enhanced protection against scratches, chips, stains, tree gum, bird droppings, water spot protection, ease of cleaning, and protection against the contaminants and stains, while achieving a high luster finish with a streak free appearance.

In specific inventive embodiments, the at least one colloidal inorganic oxide dispersion has a particle size of between 1 to 500 nm and still other embodiments from 2 to 100 nm. The surface treatment provides a hard surface cleaning and also forms a film to the applied surface. Embodiments of the vehicle hard surface treatment compositions provide treated surface properties that include keeping clean, scratch/mar defense, bug repellency, UV protection, and weathering defense. The improved vehicle hard surface treatment compositions create treated surfaces that are highly smooth and lubricious which provide enhanced protection against scratches, chips, stains, tree gum, bird droppings, water spot protection, ease of cleaning, and protection against the contaminants and stains, while achieving a high luster finish with a streak free appearance.

It is to be understood that in instances where a range of values are provided, for example with respect to a weight percentage range of a composition component, that the range is intended to encompass not only the end point values of the range but also intermediate values of the range as explicitly being included within the range and varying by the last significant figure of the numeral. By way of example, a recited range of from 1 to 4 is intended to include 1-2, 1-3, 2-4, 3-4, and 1-4.

In embodiments of the surface treatment composition, one or more automotive hydrocarbon wax components or one or more polysiloxane components may be used for detailing purposes to clean and polish the hard surface and to impart a grainless finish of high sheen after buffing.

As used herein, grainless finish is defined as with a Diffracto analysis D number of less than 100 after buffing of the composition into the substrate.

In inventive embodiments of the surface treatment composition, one or more of hydrophobicity or water repellency enhancers are present which impart water repellency and enhanced weathering properties to the finish. The one or more of hydrophobicity or water repellency enhancers form a protective barrier on porous and semi-porous surfaces that imparts water repellency and weathering protection properties to the finish. The water repellency or hydrophobicity means water will be repelled instantaneously, i.e., water will bead up and roll off the surface along with most dust, grime, or mud because they are prevented from forming a bond to the painted body panels as opposed to accumulating on the surface. Furthermore, any remaining dust on the car can be removed with less effort, while snow and ice does not stick to the treated surfaces and mud just slides off.

As used herein, porous is defined as a surface that has the attribute of being permeable to fluids yet are generally not permeable to dirt/dust/splashes.

As used herein, semi-porous is defined as a surface that has the attribute of being permeable to limited fluids yet generally not permeable to dirt/dust/splashes.

In specific inventive embodiments, aqueous dispersions of inorganic oxides are used. These dispersions illustratively include silicon dioxide, titanium dioxide, zirconium dioxide, and combinations thereof. It is appreciated that films formed from an inventive composition that include either titanium dioxide or zirconium dioxide impart a substrate self-cleaning effect.

The aqueous dispersion of inorganic oxides colloids is readily stabilized by either electrostatic stabilization or steric stabilization. For the electrostatic stabilized system, particles are electrically charged and readily interact with other substances such as dust particles and can attach themselves to the dust particles to facilitate the cleaning process and also to keep the treated surface clean and easier to clean. By way of example, an inorganic colloidal particle having a surface terminated in carboxyl moieties at basic pH presents a field of negative charges and corresponding cations to the environment. It is appreciated that sulfonates and ammonium charged moieties are also operative herein and provide negative and positive charged surface, respectively. Such molecules have the general formula:

$$X\text{—}R\text{—}Y \quad \text{(I)}$$

where X is a hydroxyl, amine, trialkoxysilane with $C_1$-$C_6$ alkyl; R is $C_2$-$C_{20}$ alkyl, $C_2$-$C_{20}$ alkyl, or $C_6$-$C_{12}$ aryl; and Y is an ionizable group of carboxyl, sulfonyl, sulfynyl, ammonium, alkyl ammonium, benzalkonium, nitrate, or phosphate.

Steric stabilization involves the inclusion of surface bounding molecules that preclude colloidal particles from colliding and fusing. Surface bounding molecules that preclude such contact include those that are chemically bonded to the particle surfaces, as well as those that form a micelle or clathrate around the particle. Such molecules that bond to the surface have the general formula:

$$X\text{—}R\text{—}Z \quad \text{(II)}$$

where X and Y are the aforementioned moieties, and Z is hydroxyl, amine, epoxy, or vinyl. It is appreciated that UV reactive moieties such as epoxy or vinyl are reactive under ambient sunlight to promote adhesion of the colloid to the substrate. Such molecules (II) operative herein illustratively include aminopropyltrimethoxysilane, 3-aminopropyltriethoxysilane, and combinations thereof. Clathrate and micelle stabilization techniques for colloids are well known to the art. J. N. Israelachvili, et al. Journal of the Chemical Society, Faraday Transactions 2: Molecular and Chemical Physics, 72 (1976) 1525-1568; and Y. A. Dyadin et al. Mendeleev Communications, 5 (1995) 239-240.

As a result, it has been surprising found that inclusion of a colloidal inorganic oxide dispersion significantly improves the efficiency of hard surface cleaning composition. These dispersions can be aqueous in nature and formulated to combine with a vehicle polish or wax. It has also been observed that the colloidal inorganic oxide dispersions do not abrade the vehicle substrate during polishing. Without intending to be bound to a particular theory, the colloidal stabilization moieties deform in response to external buffing forces and prevent the inorganic particle at the core of the colloid from contacting the substrate to induce abrasion thereof.

When a surface cleaning formulation is enhanced with a colloidal inorganic oxide dispersion, a surface with an inventive film thereon has enhanced anti-dust properties and at the same time glass surfaces are less likely to exhibit fogging compared to untreated surfaces. Therefore, the colloidal inorganic oxide dispersions may be used to adjust the hydrophobic or hydrophilic properties of a target surface to which an inventive film is applied. As a result, treated surfaces shed dust naturally, look cleaner/fresher, and require less manual maintenance.

The colloidal inorganic oxide dispersions used in inventive embodiments of the composition may contain particles with a mean particle size range from 1 to 500 nm, or even 2 to 100 nm and pH range between 2 and 12. A non-limiting example of such a dispersion is colloidal silica is an alkaline aqueous dispersion of colloidal silica that is 10 to 50 percent solids by weight. Likewise, titania and zirconia dispersions are also formed in aqueous solutions with similar loadings and sizes. While the particles are discrete and typically have a spherical shape, it is appreciated that non-spherical colloids are also readily formed and used in the present invention. H Lee et al. Int. J. Precis. Eng. Manuf. 16 (2015). 2611-2616. The colloidal dispersions having a viscosity in the range from 3 centipoise (cPs) to 20 cPs and with density range from 1.10 to 1.30 g/ml are particularly well suited for formulation into an inventive composition.

In specific inventive embodiments of the composition, water glass that is composed of soluble silicate with water or $C_1$-$C_6$ alcohol added to the surface cleaning composition to impart a highly durable, easy to clean coating. Cations for the silicate to impart solubility illustratively include sodium, potassium, aluminum, or combinations thereof. The water glass component is believed to form an in situ nanometer scale layer on the target surface upon the evaporation of the water glass solvent to impart highly durable non-stick and easy clean characteristics to the film. The thickness of the water glass silicate layer is typically between 1 and 300 nm.

In some inventive embodiments, polysilazanes add included in an inventive composition to wet the automotive hard surface treatment composition treated surface to enhance adhesion of the coating to the surface and make it much easier to clean the treated surface. Furthermore, the hardness of the hardened film helps to prevent swirl marks and marring during subsequent vehicle washing.

A wetting agent, such as a perfluoroalkyl- or polyfluoroalkyl-containing compound is present in the composition to promote wetting, reduce surface tension, enhance leveling, and film forming characteristics on tire surfaces. The inventive composition is formulated so as to be self-levelling on a treated surface to ensure a smooth and uniform coating on the vehicle surface with an initial shine of up to 230 gloss units. Wetting agents operative herein illustratively is a non-ionic polymeric fluorochemical surfactant, a fluoroaliphatic polymeric ester in a hydrocarbon solution, a polyfluoroalkyl betaine amphoteric surfactant, nonionic polymeric fluorinated surfactants, anionic phosphonated fluorinated surfactants, nonionic ethoxylated fluorinated surfactants, or a combination thereof. Typically, the wetting agent is present from 0.05 to 4 total percent, while in some other embodiments is present from 0.1 to 0.7 total weight percent.

An emulsified wax, emulsified silicone or a combination thereof are present. A wax emulsion composed of a finely divided particulate wax and a surfactant dispersed in water. A wax operative herein is a paraffin wax, or a wax based on a natural source such as castor oil, palm or soybeans with triglycerides or olefins making up the majority weight of the wax having a with a melting point ranging 110° F. and 140° F. In still other embodiments, the wax has a melting temperature of between 125° F.-130° F. which helps with emulsion stability in comparison to refined paraffin wax emulsions. The wax solids content of the emulsions can be as high as 45 percent solids, based on the total weight of the emulsion. Wax emulsions usually include between about 15 percent to 40 percent (by weight) wax, and with from about 5 percent to 25 percent (by weight) surfactant added based on the weight of the wax. Wax based emulsions are formulated according to the present invention with a cationic charge and promote water repellency on a plastic substrate.

Waxes that are to be emulsified often include moieties such as carboxyl, acid or ester groups attached to the wax polymer. In the process of emulsification these moieties are acid modified to promote micelle formation around the wax by the surfactant. For the preparation of these emulsion types, acids, such as glacial acetic acid, or mineral acids such as hydrochloric acid, sulfuric acid or similar acids, are utilized for functional group modification. The quantity of functional groups that need to be modified in order to form a stable emulsion can vary depending on characteristics of the wax such as its molecular weight and amount of chain branching. This value, and the acid number, described below, provide an indication of the free carboxylic acid and ester content of the wax. The ASTM D1386 represents a method to determine the acid number; the quantity, in milligrams, of KOH necessary to neutralize one gram of wax, indicating the amount of free carboxylic acid present. According to the present invention, the wax emulsion has an oil content of less than 5 percent by weight and in other embodiments, the oil content is between 1-3 percent. A wax emulsion is typically pre-formulated and added to the other formulation components.

The wax compositions in an inventive wax emulsion have melting points between 110° F. and 140° F. (as determined for example by Mettler Drop Point). Cationic surfactants operative herein illustratively include imidazolines, diethyl amine, or ethoxylated amines, such as tallow amine.

A silicone emulsion operative herein is readily formed according to conventional techniques and is commercially available. Suitable silicone emulsions operative herein are detailed in for example U.S. Pat. Nos. 4,221,688; 4,504,549; and 4,535,109. A typical silicone emulsion per the present invention has a weight average molecular weight of between 100,000 and 2,000,000. In some inventive embodiments, the silicone is elastomeric. The emulsion is between 2 and 40 percent by weight silicone with stabilizing surfactant and a majority phase of water. Upon drying, a hydrophobic film results that is hardened according to the present invention by the inclusion of the colloidal dispersion or water glass.

Typically, the emulsion is present from 1 to 18 total percent, while in some other embodiments is present from 2 to 12 total weight percent. Water contained within emulsions as a carrier or other components is not counted toward total amounts of water in the following tables or the appended claims.

A co-solvent or combination of co-solvents are readily added to promote the storage stability and miscibility of the composition components in a water based inventive composition. A co-solvent operative herein is capable of dispersing an emulsion and illustratively includes short chain alcohols of isopropanol, ethanol, ethylene glycol, propylene glycol, diethylene glycol, diethylene glycol monoethyl ether, ethylene glycol monoethyl ether, and combinations thereof. Typically, a co-solvent, if present, is included in amounts of up to 10 total percent, while in some other embodiments is present from 1 to 3 total weight percent. Preferably, the co-solvent is VOC exempt. As used herein, "VOC" is defined as a compound listed on the United States Environmental Protection Agency Master List of Volatile Organic Compounds.

It is further appreciated that additional components may be added to embodiments of the inventive vehicle surface treatment composition illustratively including a co-solvent, a defoaming agent, a surfactant not associated with component emulsions, a biocide, a fragrance, a pigment, a polymeric thickener, or combinations thereof.

An inventive surface treatment composition in some embodiments includes a defoaming agent in an amount present to inhibit blister formation in a surface dress coating so produced by the inventive composition. Defoamer agents operative herein illustratively include silicone based defoamers, mineral oil based defoamers, and mixtures of foam destroying polymers and hydrophobic solids such as polyureas, as are known to the art. Specific exemplary silicone based defoamers illustratively include silica-filled polydimethylsiloxane and polyether-modified polysiloxanes. While the optimal amount of a given defoamer depends on a variety of factors that include viscosities and surface tension of other components, a defoamer, if present, is included in amounts of up to 5 total weight percent and in other embodiments from 0.05 to 1 total percent.

An inventive water-based surface treatment composition includes in some embodiments a surfactant present in an amount to emulsify the components of the inventive surface treatment composition to an extent such that the composition is able to form a stable oil-in-water emulsion, or water-in-oil emulsion, or microemulsion. Surfactants operative herein illustratively include nonionic ethoxylated fluorinated surfactants, polyether modified polydimethylsiloxane, polyether modified polymethylalkylsiloxane, aralkyl modified polymethylalkylsiloxane, polyester modified hydroxyl functional polydimethylsiloxane, acryl functional polyester modified polydimethylsiloxane, polyether polyester modified hydroxyl functional polydimethylsiloxane, solution of polyacrylate, solution of a fluoro modified polyacrylate, polymeric fluorinated, ethoxylated alcohol, ethoxylated fatty acid, sorbitan ester, ethoxylated castor oils, alkyl polysaccharides, sorbitan monostearate, sorbitan monolaurate, sorbitan oleate, polyoxyethylene sorbitan, polyoxyethylene sorbitan fatty acid ester, polyoxyethylene sorbitan monooleate surfactants; or anionic phosphonated fluorinated, phosphate ester, aliphatic phosphate ester; or cationic ethoxylated fatty ammonium ethosulphate, ethoxylated alkyl amine surfactants. A surfactant, if present, is included in amounts of up to 5 total weight percent and in other embodiments from 0.05 to 1 total percent.

An inventive surface treatment composition in some embodiments includes a fragrance. A fragrance, if present is included in amounts of up to 5 total weight percent and in other embodiments from 0.1 to 3 total percent.

An inventive surface treatment composition in some embodiments includes a biocide. A biocide is defined herein as having activity against at least one of Gram positive bacteria, Gram negative bacteria, yeasts and fungi associated with a healthy human subject. Biocides operative herein illustratively include benzoic acid, parabens, salicylic acid, carbolic acid, sorbic acid, alkyl p-hydroxybenzoates, p-chlorometacresol, hexachlorophene, benzalkonium chloride, chlorohexidine chloride, trichlorocarbanilide, phenoxyethanol, acylsarcosines, glutathione, malic acid, tartaric acid, ascorbic acid, ascorbates, essential plant oils, and combinations thereof. A biocide, if present, is included in amounts of up to 5 total weight percent and in other embodiments from 0.001 to 1 total percent.

A pigment is provided to provide opacity, color, enhance environmental properties such as moisture and corrosion resistance. A pigment is typically present from 0 to 10 total weight percent and specific inventive embodiments from 1 to 6 total weight percent. Pigments operative herein include organic, inorganic and mixed metal oxide pigments such as carbon black, phthalol blue, quinacridone red, red iron oxide, copper chrome black, extender pigments such as talc, barytes, silica, calcium carbonate, clay and corrosion inhibitive pigments normally comprised of the combination of sacrificial metal such as zinc or comprised of metal ions (cations) derived from: zinc, strontium, chromium, lead, molybdenum, aluminum, calcium or barium and anions, such as those derived from phosphorous (orthophosphoric and polyphosphoric acids), chromic acid and boric acid, and combinations thereof. Exemplary corrosion inhibitor pigments operative herein include organically modified zinc aluminum molybdenum orthophosphate hydrate and zinc-5-nitroisophthalate.

An inventive surface treatment composition in some embodiments includes a polymeric thickener. A polymeric thickener is chosen to be dispersible in the water and ideally be optically transparent in the visible spectrum to an unaided, normal human eye. Polymeric thickeners operative herein illustratively include polyacrylic acid, acrylate emulsions, and combinations thereof. A polymeric thickener, if present, is included in amounts of up to 5 total weight percent and in other embodiments from 0.1 to 3 total percent.

The components of an inventive surface treatment composition are solvated to dissolve in a solvent to yield a clear, colorless solution or suspension in the case of colloid being present. A preferred solvent is water and makes up the majority by weight of the composition.

The method of application of inventive surface treatment compositions to the surface includes the step of applying the composition to the surface, and allowing solvent associated with the colloid or the water glass to evaporate from the composition to form a hard surface protective silicate film layer. In some embodiments, the applied composition is buffed into the surface. Buffing can occur while the composition is still wet (contains intrinsic solvent), partially dried, or wholly dried.

An inventive film formed protects against mud, dust, dirty rain, water spots, and grime. The film forming process seals all the pores making the surface hydrophobic. The film also forms a secondary bonding to the surface resulting in a sacrificial layer that is water and car wash resistant. The film and secondary bonding repel dust and water and makes the surface easier to clean.

An inventive surface treatment composition is readily applied by a vehicle owner through resort to a conventional trigger spray application, propellant aerosol for spray or foam, or a sponge or cloth for wipe application onto the vehicle surface. The inventive surface treatment composition may take the form of a liquid, semi-solid, cream, paste, or gel types of the hard surface treatment composition for application to the automotive hard surfaces.

An inventive surface treatment composition has a fully formulated viscosity of between 5 and 400 cSt, as measured at room temperature.

Typical and preferred compositions according to the present invention are provided in Table 1.

TABLE 1

Inventive Surface Treatment Composition
(amounts in total weight)

| Ingredient | Typical | Preferred, if present |
|---|---|---|
| Colloidal inorganic oxide dispersion (10-50% solids by weight) or water glass | 0.5-25 | 2-10 |
| Wetting Agent | 0.05-4 | 0.1-0.7 |
| Emulsified wax or emulsified silicone (2 to 40% solids by weight) | 1-18 | 2-12 |
| Defoamer | 0-5 | 0.05-1 |
| Co-solvent | 0-10 | 1-3 |
| Surfactant | 0-5 | 0.1-3 |
| Fragrance | 0-1 | 0.01-0.5 |
| Biocide (20% active in solution) | 0-1 | 0.001-0.5 |
| Pigment | 0-10 | 1-6 |
| Polymeric thickener | 0-5 | 0.1-3 |
| Water | to 100% | to 100% |

To summarize, the perform benefits of these automotive hard surface treatment compositions illustratively include cleaning, keep clean, scratch/mar defense, bug repellency, highly smooth and lubricious surface to protect against scratches, chips, stains, tree gum, bird drop, UV protection, high luster finish, streak free appearance, weathering defense, water spot protection, ease of cleaning, and protection against the contaminants and stains.

The present invention is further detailed with respect to the following nonlimiting examples that are provided to further illustrate the preparation of inventive compositions and certain attributes associated with the resulting coatings on tire surfaces.

EXAMPLES

Example 1

The following composition was formed by mixing in water: 5 total weight percent of 24% by weight silicone of self-emulsifiable, 200,000 average molecular weight, elastomeric silicone additive, 5 total weight percent of colloidal silica dispersion (40 weight percent silica, average particle size of 45 nm, pH 8.2), 0.45 total weight percent sodium hexylglucosides hydroxypropyl phosphate, 1.17 total weigh percent 2-butoxyethanol, 0.9 total weigh percent 2-propanol, 0.006 total weigh percent benzisothiazolin-3-one. The composition is in the form of a clear suspension.

The composition dried for 8 hours at 20 degrees Celsius to form a film with a shiny appearance.

Example 2

The composition of Example 1 is repeated with the replacement of the colloidal silica with a like amount of hydrous aluminum silicate. The composition is in the form of a clear suspension.

The composition dried for 8 hours at 20 degrees Celsius to form a film with a shiny appearance.

Example 3

The composition of Example 1 is repeated with the replacement of the colloidal silica with a like amount of colloidal titania that is largely anatase in crystalline form with a spherical particle size from range from 10 to 15 nm present at 20 weight percent of the clear dispersion. The composition is in the form of a clear suspension.

The composition dried for 8 hours at 20 degrees Celsius to form a film with a shiny appearance.

Example 4

The following composition is formed by mixing in water: 2.7 total weight percent of polydimethylsiloxane emulsion ethoxylated isoalcohols, 9 total weight percent calcined kaolin, 5 total weight percent of colloidal silica dispersion (40 weight percent silica, average particle size of 45 nm, pH 8.2), 5 total weight percent of 24% by weight silicone of self-emulsifiable, 200,000 average molecular weight, elastomeric silicone additive, 0.2 total weight percent fragrance, 0.9 total weigh percent aqueous acrylate emulsion (20 weight percent acrylate polymers), and 0.006 total weigh percent benzisothiazolin-3-one. The composition is in the form of a clear suspension.

The composition dried for 8 hours at 20 degrees Celsius to form a with a shiny appearance.

Example 5

The following composition is formed by mixing in water: 5 total weight percent of equal parts by weight of ammonium lauryl sulfate and cocamidopropyl hydroxysultaine, 2.7 total weight percent equal parts by weight of ethylene glycol distearate, cocamidopropyl hydroxysultaine, and sodium alpha-olefin sulfonate; 5 total weight percent of colloidal silica dispersion (40 weight percent silica, average particle size of 45 nm, pH 8.2), 5 total weight percent of 24% by weight silicone of self-emulsifiable, 200,000 average molecular weight, elastomeric silicone additive, 1.62 total weight percent sodium chloride, and 0.006 total weigh percent benzisothiazolin-3-one. The composition is in the form of a clear suspension.

The composition dried for 8 hours at 20 degrees Celsius to form a film with a shiny appearance.

Comparative Examples

The composition of Example 1 is repeated absent the colloidal silica. The composition is in the form of a clear suspension.

Patents and publications mention the specification are indicative of the levels of those skilled in the art to which the invention pertains. These patents and publications are incorporated herein by reference to the same extent as if each individual patent or publication was specifically and individually incorporated herein by reference.

The forgoing description is illustrative of particular embodiments of the invention, but is not meant to be a limitation upon the practice thereof. The following claims, including all equivalents thereof are intended to define the scope of the invention.

The invention claimed is:

1. A vehicle surface treatment composition comprising:
a colloidal inorganic oxide dispersion; and
a self-emulsifying silicone emulsion with which said colloidal inorganic oxide dispersion and a wetting agent form a clear suspension, said wetting agent being a non-ionic polymeric fluorochemical surfactant, a fluoroaliphatic polymeric ester in a hydrocarbon solution, a polyfluoroalkyl betaine amphoteric surfactant, a nonionic polymeric fluorinated surfactant, an anionic phosphonated fluorinated surfactant, a nonionic ethoxylated fluorinated surfactant, or a combination thereof, said wetting agent present from 0.05 to 4 total weight percent, the vehicle surface treatment forming a smooth and uniform coating on a vehicle surface with an initial shine of from 90 to 230 gloss units.

2. The surface treatment composition of claim 1, wherein said silicone emulsion is present, elastomeric and has a weight average molecular weight of between 100,000 and 2,000,000.

3. The surface treatment composition of claim 1, wherein said colloidal inorganic oxide dispersion is a silica dispersion.

4. The surface treatment composition of claim 1, wherein said colloidal inorganic oxide dispersion is titanium dioxide or zirconium dioxide.

5. The surface treatment composition of claim 1, wherein said colloidal inorganic oxide dispersion is stabilized by either electrostatic stabilization or steric stabilization.

6. The surface treatment composition of claim 1, wherein said colloidal inorganic oxide dispersion has a mean particle size of between 1 to 500 nm.

7. The surface treatment composition of claim 1, wherein said colloidal inorganic oxide dispersion has a particle size of between 2 to 100 nm.

8. The surface treatment composition of claim 1, wherein said colloidal inorganic oxide dispersion has a viscosity in a range from 3 cPs to 20 cPs and with a density range from 1.10 to 1.30 g/ml.

9. The surface treatment composition of claim 1, further comprising a soluble silicate.

10. The surface treatment composition of claim 1, further comprising a defoamer.

11. The surface treatment composition of claim 10, wherein said defoamer is a polysiloxane.

12. The surface treatment composition of claim 1, further comprising polysilazanes.

13. The surface treatment composition of claim 1, wherein the initial shine is from 100 to 230 gloss units.

14. A method of forming a coating comprising:
applying the composition of claim 1 to a vehicle exterior component; and
allowing the composition to dry to form the coating.

* * * * *